United States Patent
Fox

[11] 3,903,416
[45] Sept. 2, 1975

[54] METHOD AND APPARATUS FOR INSPECTING TIRES

[75] Inventor: Richard L. T. Fox, Bedford Heights, Ohio

[73] Assignee: Picker Corporation, Cleveland, Ohio

[22] Filed: May 7, 1973

[21] Appl. No.: 358,022

[52] U.S. Cl. .............................. 250/360; 250/358
[51] Int. Cl. .......................................... G03b 41/16
[58] Field of Search ............ 250/358, 359, 360, 450

[56] References Cited
UNITED STATES PATENTS

| | | | |
|---|---|---|---|
| 2,272,893 | 2/1942 | Bosomworth | 250/450 |
| 2,301,251 | 11/1942 | Capen | 250/360 |
| 3,550,443 | 12/1970 | Sherkin | 73/146 |
| 3,621,246 | 11/1971 | Horsey | 250/360 |
| 3,621,247 | 11/1971 | Lide | 250/360 |
| 3,698,971 | 10/1972 | Mattheros | 73/146 |

Primary Examiner—James W. Lawrence
Assistant Examiner—B. C. Anderson
Attorney, Agent, or Firm—Watts, Hoffmann, Fisher & Heinke Co.

[57] ABSTRACT

A method and apparatus for inspecting tires is disclosed wherein a tire may be completely x-rayed for constructional defects from rim to rim by use of a panoramic x-ray imaging unit which need not be manipulated during the inspection. A tire having side walls, rims and tread area extending between the side walls is supported for rotation. An x-ray source is positioned radially near the rims to direct x-rays through the side walls, rims and tread area of a circumferential section of the tire adjacent the source. A curved fluoroscopic screen is disposed about the x-ray tube focal spot and the circumferential section of the tire so that x-rays from the focal spot pass through the rims, side walls and tread area and impinge on the screen. The screen fluoresces to produce an x-ray image of the tire side walls, rims and tread area. A T.V. camera is optically coupled to the screen to view the entire screen. The image is transmitted to a T.V. monitor from which a visual inspection of the tire is made.

The x-ray tube produces a wide angle beam of x-rays which simultaneously pass through all portions of the circumferential tire section and impinge on the screen across its entire surface. The T.V. camera transmits the panoramic image produced by the screen to the monitor and the tire is revolved about its axis a single time to complete the inspection.

3 Claims, 4 Drawing Figures

1

METHOD AND APPARATUS FOR INSPECTING TIRES

CROSS REFERENCED PATENT APPLICATIONS

U.S. patent application Ser. No. 186,985 filed Oct. 6, 1971 now abandoned, entitled METHOD AND APPARATUS FOR INSPECTING TIRES by Theodore Neuhaus.

U.S. patent application Ser. No. 254,937 filed May 19, 1972 now U.S. Pat. No. 3,803,415, entitled METHOD AND APPARATUS FOR INSPECTING TIRES by Richard L. T. Fox.

BACKGROUND OF THE INVENTION

1. Field of the Invention

The present invention relates to a method and apparatus for inspecting tires and more particularly relates to a method and apparatus for inspecting tires by the use of penetrating radiation.

Vehicle tires are normally constructed of rubber or a rubber-like material surrounding fabric plies and are shaped to define radially extending axially spaced side walls and a tire tread area extending between the side walls. Each side wall defines a bead rim having a stranded reinforcing cable extending about the rim which is encapsulated within the rubber. Many tires are constructed with one or more belts which extend circumferentially about the tire within the tread area. In order to inspect certain aspects of the construction of a tire, it is necessary to employ penetrating radiation, such as x-rays, in order to determine the presence of any of a number of different kinds of flaws.

Frequently tires to be inspected are supported on a tire manipulator apparatus and x-rays are directed through the tire to an x-ray detection system which provides inspection information based on the intensity of the x-radiation detected after the radiation has passed through the tire. In many installations the detection systems are constructed to provide an x-ray image of the tire being inspected on a T.V. monitor.

2. The Prior Art

Prior art x-ray tire inspection systems have been proposed in which an x-ray beam was directed through a tire wall from bead rim to bead rim so that x-ray images of successive portions of the tire wall were produced on a T.V. monitor.

In some proposals a tire was supported for rotation by a tire manipulator and x-rays were directed successively through one bead rim, a side wall, the tread area and through the other side wall and bead rim to a stationary screen of an x-ray detecting or imaging system. The tire was manipulated to interpose different portions of the tire wall between the x-ray source and the screen to, in effect, cause the x-rays to be scanned about the tire while the tire was rotated about its axis relative to the stationary screen and x-ray tube. The x-ray beam thus was passed through all portions of the tire to the screen.

In other proposals the imaging system employed an x-ray imaging unit which was orbitally moved about a circumferential section of the tire and the x-ray tube. The unit moved about an axis of movement extending approximately through the x-ray tube focal spot and was capable of imaging x-rays which passed through the tire wall from bead rim to bead rim. In these systems the tire was rotated about its centerline to enable complete inspection from rim to rim, but the tire did not have to be otherwise manipulated because of the orbital movement of the imaging unit.

In the prior art proposals of the types referred to, the tire had to rotate a substantial number of complete revolutions about its axis, e.g. 4 or more revolutions, in order for the tire to be completely inspected. Since the tires were rotated at relatively small angular velocities the inspection process could require several minutes to complete.

Tire inspection apparatus employing orbitally movable imaging units have generally been preferred to the apparatus employing stationary imaging units because in the latter the tire manipulators had to be rotatably movable to produce rim to rim imaging. This substantially complicated the apparatus, was slow in operation and in some circumstances required the operator to remove the tire from the manipulator. Turn the tire around and replace the tire on the manipulator for complete bead to bead inspection.

The orbitally movable imaging units were preferred because of their higher operating speeds and because of the relative ease with which tires were loaded on and unloaded from the manipulators. Even though use of this type of imaging unit represented a substantial improvement over prior systems the cycle time of these systems was still not sufficiently short that extremely large numbers of tires could be inspected economically.

Many of the commercially successful tire inspection apparatuses have employed imaging units which comprised an x-ray responsive fluorescent screen optically coupled to an electronic image intensifier tube by a system of mirrors. The image intensifier tube was optically coupled to a T.V. camera by high speed lenses so that the intensified light image at the output of the intensifier tube was viewed by the camera and transmitted to a T.V. monitor.

These imaging units provided high quality images but the units were relatively expensive, of large size, and were rather delicate. Accordingly the mechanisms for orbiting the imaging units about the tire and radiation sources had to be of relatively large size and were preferably constructed so that the imaging unit could not collide with other components of the apparatus and so that mechanical shocks due to starting and stopping the movement of the units were minimized.

In some other tire inspection apparatuses the imaging unit has comprised a planar fluorescent screen and a T.V. camera for viewing the screen. These units have been smaller and somewhat less expensive than the light amplifier type units but have still required the mechanisms for orbitally moving them about the tire. Furthermore these imaging units were also subject to damage due to collisions with other components of the apparatus and to shocks from acceleration and deceleration in their orbital motions.

The complexity and cost of the mechanisms for orbiting the imaging units and the associated control devices were substantial. The imaging units were required to orbit about an axis extending through or substantially close to the focal spot of the x-ray source in order to avoid varying the intensity and magnification of the image on the T.V. monitor from place to place about the wall of a tire being inspected. When tires of differing diameters were inspected it was sometimes necessary to construct the orbiting mechanism to enable shifting of the axis of orbital movement of the imaging units. In such systems it was also necessary at times to provide for shifting the imaging units to change their distance from the axis of orbital movement. Some proposed systems employed imaging units which swung in a vertical plane about a horizontal orbit axis and these units had to be counterweighted. In short, the orbiting mechanisms, even though reliable and of high quality, tended to be large and complicated which resulted in relatively large system costs and size.

Another problem was image distortion created by the geometry of the system components. To minimize distortion it was found that the radiation from the focal spot should impinge on the imaging unit screen approximately normal to the plane of the screen throughout the inspection cycle. To further reduce image distortion it was found that the tire wall section through which the radiation was directed at any given time should extend generally perpendicular to the radiation. These requirements could not be met in many prior art apparatuses because the imaging units could not be positioned to produce desired undistorted images of one or both of the tire bead rims due to interference between the imaging unit and components of the tire manipulator and because the shape of the tire wall around the bead rims which did not extend perpendicularly through the radiation.

The advent of apparatus which comprised a radiation source disposed within or adjacent the torus of the tire being inspected and of apparatus in which the tire being inspected was inflated to spread the bead rims reduced the magnitude of this problem but did not entirely eliminate it.

In addition to the noted prior art tire inspectors there was another suggested tire inspection apparatus in which it was proposed that tires being inspected be axially stretched into a right cylindrical shape and subjected to x-rays directed from within the tire to a stationary x-ray detector. This proposal is not known to have ever been commercialized, primarily because very few, if any, cured tires could be distorted in the manner proposed without being destroyed. Furthermore the tire bead rims could not be inspected by apparatus of the type proposed and the tire wall would be so severely distorted by the apparatus that reliable imaging of the tire by the apparatus could not be achieved.

In summary, previously proposed tire inspection systems have employed imaging units and associated imaging unit manipulator constructions which were of complex expensive construction and did not operate sufficiently quickly to enable inspection of extremely great numbers of tires. This limited the numbers of tires which could be inspected by a single system so that the cost of inspection per tire was relatively high and inspecting entire production runs of tires could not be accomplished.

SUMMARY OF THE INVENTION

According to the present invention a new and improved tire inspecting method and apparatus is provided wherein tires can be inspected from rim to rim extremely quickly and wherein the tire inspection apparatus is considerably more compact, less complex and less expensive than the prior art proposals.

A tire inspection system constructed according to one preferred and disclosed embodiment of the invention comprises a tire manipulator structure for supporting a tire for rotation about its centerline at an inspection station, a source of tire penetrating radiation defining a focal spot positionable adjacent the tire rim diameter for directing penetrative radiation through the adjacent circumferential section of the tire from rim to irim, and a radiation detection system for detecting the intensity of radiation which has passed through the tire wall from the source and providing inspection information concerning the construction of the tire. The tire is rotated about its centerline in order to permit complete circumferential inspection of the tire from rim to rim.

An important feature of the invention resides in the use of a panoramic radiation detection unit which enables a tire to be completely inspected by penetrative radiation from rim to rim without requiring the radiation detection unit or the tire manipulator to be manipulated during the inspection. The detection unit comprises an arcuate radiation responsive element which extends partially about the circumferential tire section and the radiation source so that radiation which emanates from the source and passes through any portion of the adjacent circumferential section of the tire wall impinges on the radiation responsive element. In the preferred construction the radiation detection unit is an imaging unit which produces a radiation image of the tire being inspected. The radiation responsive element is preferably a screen constructed from a material which fluoresces, or emits visible light, when impinged on by the tire penetrating radiation. The intensity of the light emitted from any point on the screen is proportional to the intensity of the radiation impinging on the fluorescent material at that point. Accordingly, an image of the tire wall is produced by the screen.

In one preferred embodiment of the invention a T.V. camera is optically coupled to the radiation responsive screen so that the entire screen is viewed by the T.V. camera. Any image produced anywhere on the screen is viewed by the camera and transmitted to a T.V. monitor, and/or to other suitable inspection circuitry, in the form of inspection information. The T.V. camera and radiation responsive element need not be manipulated separately or as a unit during the inspection.

The radiation responsive element is preferably a generally rectangular screen which curves approximately parabolically along its longitudinal extent and is supported with its concave side extending about the circumferential section of the tire and the adjacent radiation source. The T.V. camera views the convex side of the curved screen. The end portions of the screen extend obliquely away from the tire and do not interfere with components of the tire manipulator during the inspection.

The interrelationship of the camera, the screen and the focal spot is such that the screen need not extend normal to the direction of radiation impinging on it to avoid inspection image distortion. The angularity between the direction of the penetrative radiation passing through the tire rim portions and the screen end portions is such that the images of the bead rims and adjacent side wall portions of the tire are formed over relatively wide areas on the screen end portions. The angularity between the screen end portions and the objective lens of the T.V. camera is such that the screen images of the bead rims and adjacent side wall portions are foreshortened, as viewed by the camera, and the resultant T.V. monitor image of these portions of the tire is substantially undistorted with respect to the images of other parts of the tire.

The contour of the screen can also be controlled to reduce the distortion which would otherwise be created by circumferential tire portions which do not extend normal to the direction of the tire penetrating radiation. Hence, in some systems the screen shape may vary from a parabolic curvature depending on the cross sectional shape of the tire wall being inspected.

The new imaging unit is extremely compact when compared to the prior art units and its small size, along with the absence of imaging unit orbiting mechanisms, enables the inspection system as a whole to be of considerably reduced size. The reduction in size is primarily attributable to the absence of mechanisms required to support the imaging unit for orbital movement. In the preferred embodiment the new imaging unit comprises the screen, the T.V. camera and its attached lens and a light tight housing for supporting the screen and camera. The housing is supported along the ceiling of a radiation opaque inspection booth over the inspection station.

An actuator arrangement cooperates with the imaging unit to move the unit relative to the inspection station to and away from an inspection position to enable tires to be loaded and unloaded without colliding with the imaging unit. In a preferred and illustrated embodiment of the invention, e.g. when a tire is advanced to the inspection station, the imaging unit is elevated away from the tire path of travel and when the tire is positioned for inspection the imaging unit is lowered to an inspection position adjacent the tire. The actuator arrangement enables vertical adjustment of the inspection position of the imaging unit to accommodate different sized tires at the inspection station.

In one preferred construction of the invention the source of penetrative radiation is an x-ray source which produces a wide angle beam of the radiation which emanates from the focal spot, passes simultaneously through the entire adjacent circumferential section of the tire from rim to rim and impinges across the full face of the fluorescent screen. The T.V. camera thus views an image of the entire circumferential section of the tire from rim to rim. Consequently the tire can be completely inspected during a single revolution of the tire about its centerline. This substantially reduces the time required to inspect a complete tire from rim to rim compared to the inspection time required by the prior art systems.

An imaging unit constructed according to the present invention can also be employed with an x-ray or other radiation source which functions to direct a beam of penetrating radiation about the source through successive portions of the tire wall. While such use of the new imaging unit involves revolving the tire a few times about its centerline to complete the inspection, the overall inspection apparatus is significantly simpler and of smaller overall size owing to incorporation of the new imaging unit.

Other features and advantages of the invention will be apparent from the following detailed description of a preferred embodiment made with reference to the accompanying drawings which form part of the specification.

DESCRIPTION OF A PREFERRED EMBODIMENT

Figure 1:
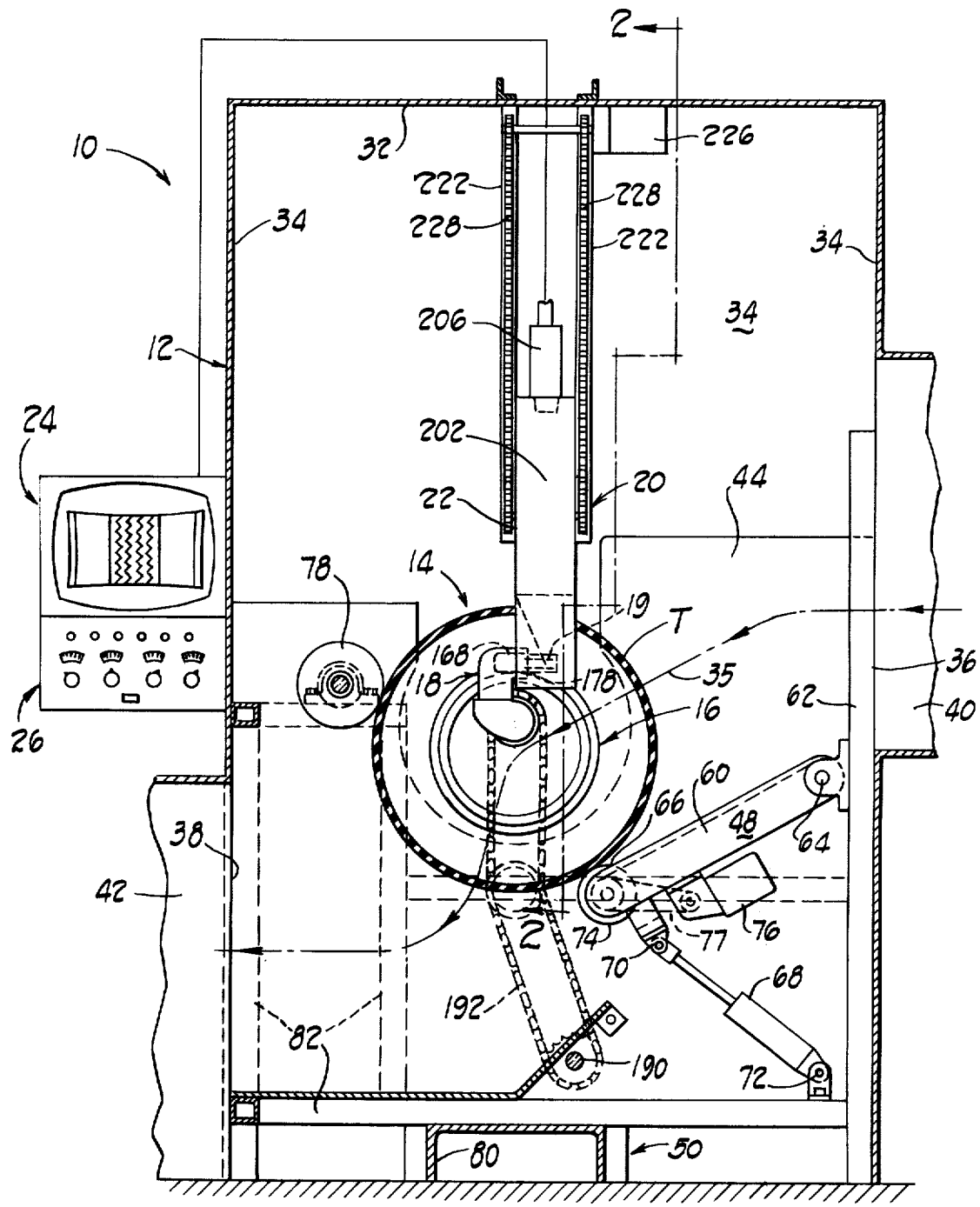
FIG. 1 is a vertical cross sectional view of a tire inspection system embodying the present invention.

A tire inspection system 10 embodying the present invention is illustrated in FIG. 1 of the drawings. The system 10 comprises an inspection booth 12 in which an inspection station generally indicated at 14 for a tire T is defined by a tire manipulator apparatus generally indicated at 16. A penetrative radiation source assembly 18 is associated with the manipulator 16 for directing x-rays from a radiation focal spot 19 through the tire T and to a radiation detection system 20. The tire T is illustrated as a conventional cured tire having side walls extending radially from the tire centerline and which include bead rim portions and a tread area extending axially between the side walls.

Inspection of the tire T is generally accomplished as follows: the tire is fed into the booth 12 to the inspection station 14 at which time the manipulator apparatus 16 engages and supports the tire. The tire is then inflated to spread the bead rims and the source assembly 18 is actuated to move the focal spot 19 of the penetrative radiation to a position axially between the tire bead rims. The manipulator 16 moves the tire relative to the focal spot so that the focal spot of the source assembly is located close to or within the toroidal volume defined by the tire. The tire is rotated and a wide angle beam of tire penetrating radiation is directed from the focal spot through the adjacent circumferential section of the tire simultaneously from bead rim to bead rim.

In the preferred and illustrated embodiment of the invention the source assembly 18 is an x-ray tube head assembly which emits x-rays. Other forms of radiation sources could be used such as radio-isotopes.

The detection apparatus 20 includes an imaging unit 22 stationed outside of the tire adjacent the circumferential section of the tire which provides inspection information concerning the construction of the tire from bead rim to bead rim. In the illustrated embodiment, the detection system 20 produces a televised radiation image of the entire circumferential section of the tire between the focal spot 19 and the unit 22 which is displayed by a television monitor 24 at an operator's station outside of the booth 12. Thus when the tire is rotated through one revolution, the operator views the image of the complete tire and the inspection is completed. The operator's station is provided with a control panel 26 by which operation of the various components of the system can be controlled by the operator.

After the tire is inspected, the manipulator 16 moves the tire relative to the source assembly to its initial position and the source assembly is withdrawn axially from the tire. The tire is deflated and the manipulator 16 releases the tire after which the tire moves from the inspection station out of the booth.

THE INSPECTION BOOTH

The booth 12 is constructed from a suitable radiation opaque material and completely surrounds the components of the inspection system so that radiation emitted during inspection cannot escape into the surrounding environment. The booth comprises a ceiling 32 and side walls 34 extending from the ceiling to the floor of a building or the like in which the system is located. A tire path of travel generally designated by a dashed line 35 (FIG. 1) extends through the booth 12 from an entrance opening 36 in one side wall 34 through an exit opening 38 defined in the opposite side wall.

The tire moves through the entrance opening 36 via an entrance tunnel 40 which is constructed from radiation opaque material. The tunnel 40 may extend along a curved path to the booth 12 so that any radiation which passes through the opening 36 is absorbed by the walls of the tunnel 40.

An exit tunnel 42 extends from the exit opening 38 and it, like the entrance tunnel, is constructed from radiation opaque material and is curved so that radiation cannot escape into the environment from the booth through the exit opening 38.

Planar vertical guide panels 44, only one of which is shown, extend parallel to each other through the booth along opposite sides of the tire path of travel 35 to maintain tires passing through the booth disposed along their intended path of travel.

THE MANIPULATOR APPARATUS

The tire manipulator apparatus 16 engages and supports a tire at the inspection station 14; inflates the tire while supporting it, manipulates the tire relative to the x-ray tube head of the assembly 18; rotates the tire during inspection; and discharges the tire from the inspection station after inspection is completed. The apparatus 16 comprises a tire ramp and drive assembly 48, a support frame structure 50 and manipulator assemblies 52, 54 (see FIGS. 2 and 3). The manipulator apparatus 16 is preferably the same as the apparatus which is illustrated and described in the above cross referenced application of Fox and is not described in complete detail below. If further details of construction of the manipulator 16 are desired reference should be made to the Fox application which is incorporated herein by this reference to it.

The tire ramp and drive assembly 48 guides the tire to the inspection station 14 from the entrance tunnel 40, supports the tire at the inspection station for engagement by the manipulator assemblies 52, 54, rotates the tire supported by the manipulator assemblies about its axis during inspection and discharges the tire from the inspection station at the conclusion of the inspection. The assembly 48 comprises a ramp member 60 connected between vertical frame members 62 at opposite sides of the entrance opening 36 by a hinge construction 64 which permits the ramp member 60 to pivotally move about the horizontal axis of the hinge construction. The projecting end of the ramp member is supported by a ram 68 which is illustrated as a single acting pneumatic ram. The ram 68 comprises a piston rod pivoted to the end of the ramp member 60 by a clevice 70 and a cylinder pivoted to the frame structure 50 by a clevice 72.

A drive roller 74 is journaled about a horizontal axis at the projecting end of the ramp member. The roller 74 frictionally engages a tire supported at the inspection station 14 and is driven by an electric motor 76 carried by the ramp member 60. The roller 74 is driven through a suitable transmission, such as a chain drive 77, which is schematically illustrated, and rotates the tire when driven.

A guide roller 78 is disposed between the guide panels 44 on the opposite side of the inspection station 14 for maintaining the tire T positioned at the inspection station in contact with the drive roller 74. The guide roller 78 is freely rotatable about its axis and may be adjustable to compensate for various tire diameters.

The ram 68 functions as an actuator for moving the projecting end 66 of the ramp member up and down about the hinge construction 64 and also functions as an air spring or biasing element for maintaining the drive roller 74 in frictional contact with the periphery of the tire. When the ramp is at the limit of its upward travel a tire is fed into the booth and rolls along the ramp member to the inspection station where the tire comes to rest on the guide roller 78 and drive roller 74 in alignment with the manipulator assemblies 52, 54.

The smaller the tire the higher the projecting end of the ramp member 60 must be positioned in order to accurately position the bead rims of the tire with respect to the manipulator assemblies. The limit of upward travel of the projecting end 66 of the ramp member 60 is controlled by an adjustable stop arrangement which may be of any suitable construction and has not been illustrated.

During inspection the manipulator assemblies 52, 54 engage the tire and urge it into driving contact with the roller 74 as is described below. After the inspection of the tire is completed the manipulator assemblies release the tire and the ram 68 retracts to move the ramp member 60 downwardly so that the tire drops from the ramp and proceeds across the floor of the booth 12 and through the exit opening 38.

THE FRAME

The frame structure 50 comprises a base frame member 80 extending across the booth 12 transverse to the tire path of travel 35, a framework generally designated at 82, which is composed of interconnected vertically and horizontally extending tubular structural members for supporting various components of the system. Manipulator assembly support frames, not shown, are connected to the base frame member 80 on opposite sides of the path of travel. Vertical abutment columns extend upwardly from opposite ends of the base frame member 80 along the exterior of the booth side walls.

THE MANIPULATOR ASSEMBLIES

Figure 2:
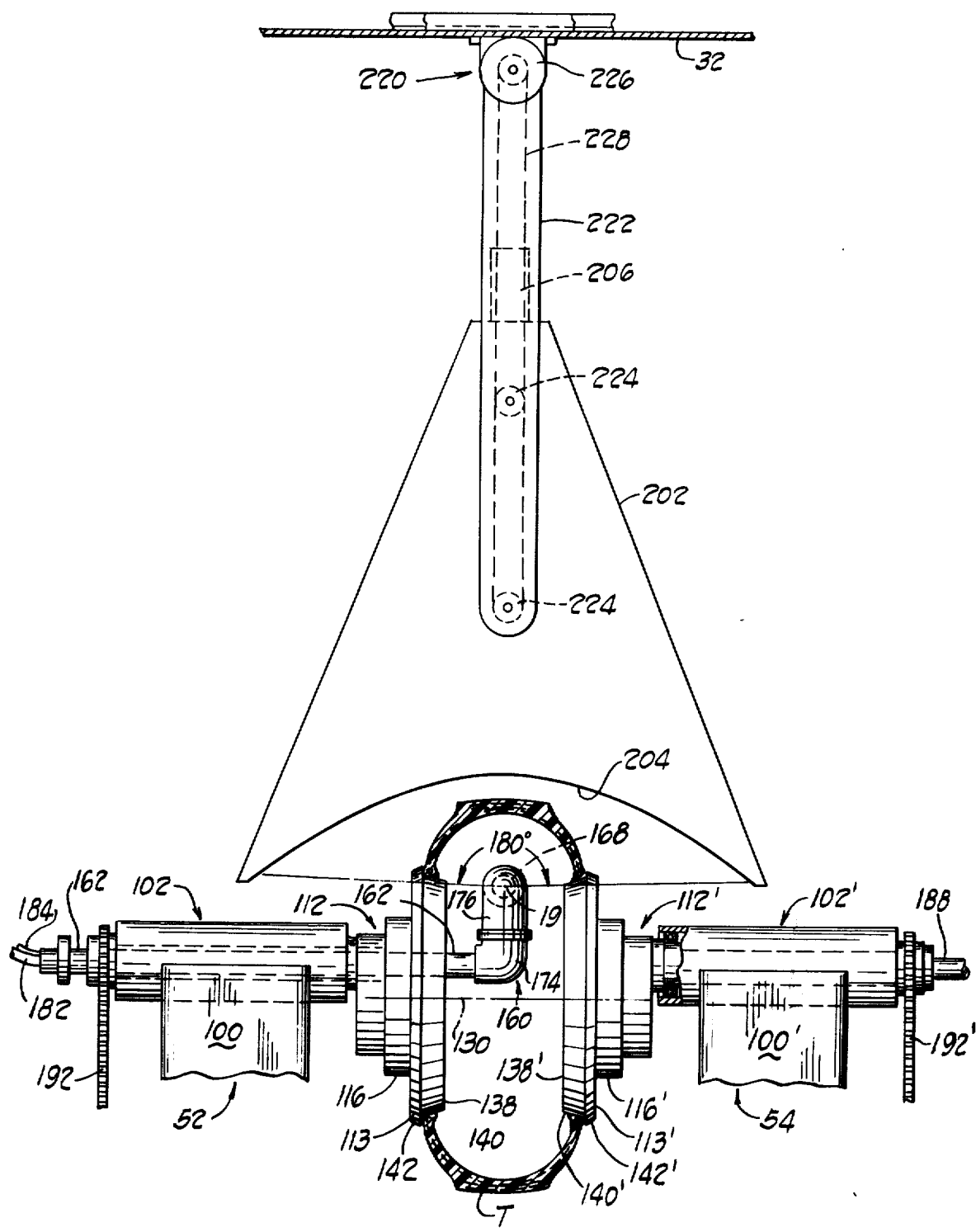
FIG. 2 is a cross sectional view seen approximately from the plane of the line 2—2 of FIG. 1 with parts of the system not shown.
Figure 3:
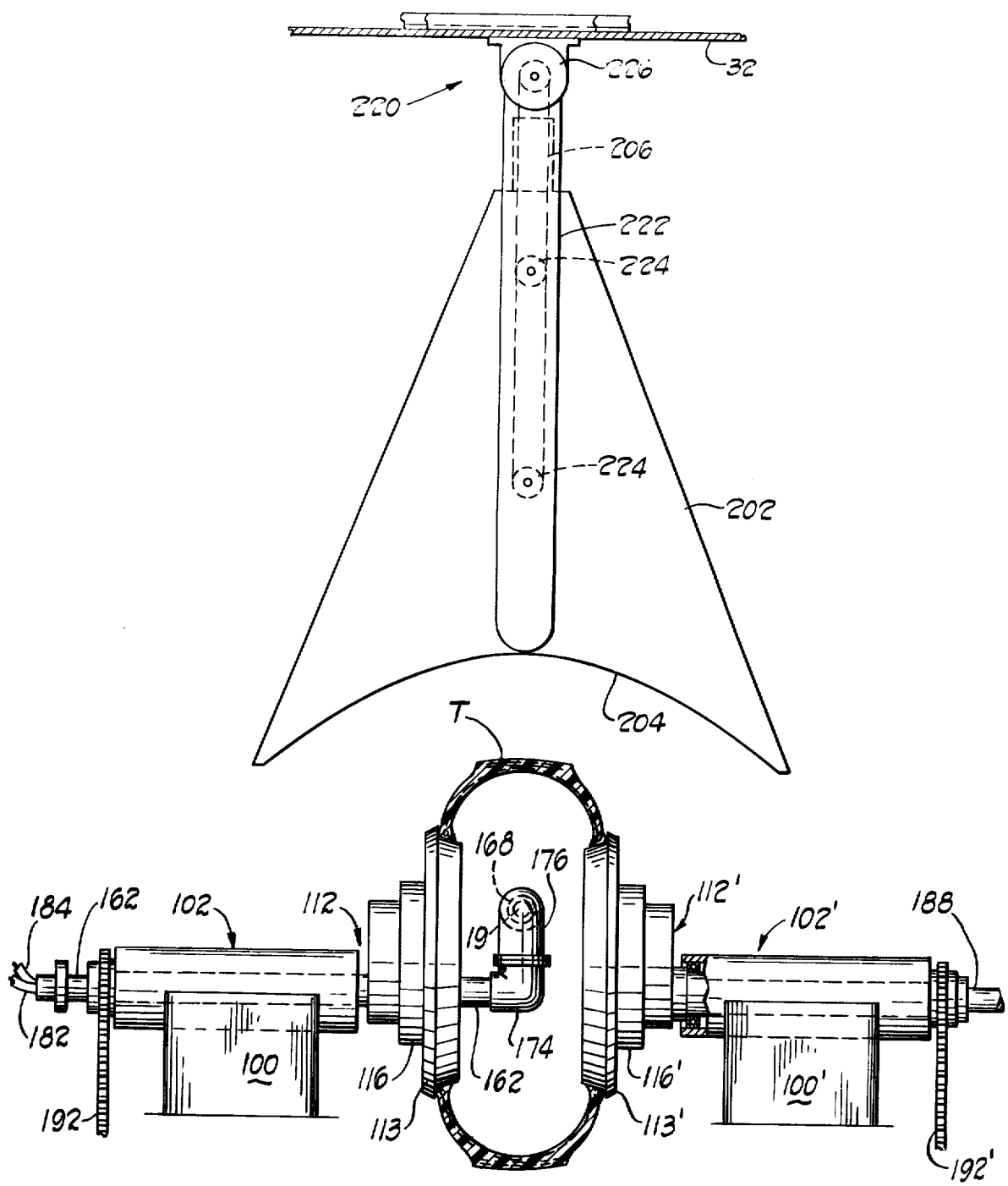
FIG. 3 is a view similar to FIG. 2 with parts shown in different positions; and, FIG. 4 is a schematic view of a part of the system of FIG. 1.

The manipulator assemblies 52, 54 are in most respects constructed identically and accordingly only the manipulator assembly 52 is described in detail in reference to FIGS. 2 and 3, so far as the common structural elements of the assemblies are concerned. Corresponding elements of the manipulator assembly 54 are indicated by identical primed reference characters in the drawings.

The manipulator assembly 52 is constructed and arranged to engage an incoming tire T at the inspection station, support the tire while it is being inflated and during the inspection, and to withdraw from the tire after completion of the inspection to permit this tire to move from the booth 12. The assembly 52 comprises a carriage assembly 100 movably supported on its manipulator support frame and a tire manipulator structure 102 carried by the carriage assembly.

The carriage assembly 100 and manipulator structure are movable with respect to the frame structure 50 toward and away from the inspection station by an actuator, not shown, which is preferably a double-acting pneumatic ram connected between the carriage 100 and the frame structure 50.

The manipulator structure 102 comprises a tire support member 112 and an annular rim member 113 carried by the member 112. The tire support member 112 is preferably tubular and journaled for rotation in the manipulator structure 102. A hub portion 116 is formed at the end of the member 112 which projects toward the inspection station. The rim member 113 is disposed about the hub portion 116 and is constructed to engage the bead rim of a tire at the inspection station to enable the tire to rotate with the rim member 113 relative to the support member 112.

The hub portion 116 is cup shaped and generally cylindrical and defines a hub axis 130 which is parallel to but offset from the axis of the support member 112; that is to say, the hub portion is eccentric with respect to the member 112. The hub portion telescopically receives an x-ray tube head as is described below.

The rim member 113 is rotatable with respect to the hub portion and comprises an annular body which extends radially from the outlet periphery of the hub portion 116 and is concentric with the hub axis 130. A suitable bearing assembly, not shown, is disposed between the rim member and the hub portion to enable the relative rotation. The rim member 113 has an axial flange 138 defining a frusto-conical surface 140 which is insertable within and engageable with the bead rim of the tire. A radial flange 142 extends from the base of the surface 140 and abuts an axially outer side of the tire bead rim to maintain the bead rim in position on the surface 140.

The rim member 113 is constructed of plastic, aluminum or other suitable material which is relatively transparent to x-rays or other radiation emanating from the focal spot 19 so that radiation images of the tire bead rims are not adversely affected by the radiation passing through the bead rims and portions of the rim members.

The rim member 113 is detachably connected to the hub portion by suitable connectors so that it may be removed and replaced by another similar rim member having a different diameter for accommodating tires having a correspondingly different bead rim diameter.

To this point the manipulator assemblies 52, 54 are identical. The assemblies differ in that the manipulator assembly 52 supports the source assembly 18 while the manipulator assembly 54 is constructed and arranged to permit inflation of the tire T when supported by the assemblies 52, 54.

THE SOURCE ASSEMBLY

The source assembly 18 comprises an x-ray tube head 160 supported adjacent the open side of the hub portion recess by a shaft-like head support member 162 which extends from the head 160 through the tubular support member 112 and beyond the opposite axial end of the structure 102. An x-ray tube head actuator, not shown, is connected between the carriage 100 and the support member 162 to move the support member 162 axially relative to the support member 112 so that the assembly 160 is moved towards and away from the hub 116. When the x-ray tube head 160 is telescopically received within the hub recess the head is protected from being struck by a tire moving to or from the inspection station along the tire path of travel.

The tube head 160 comprises a tubular double right angle housing which is connected to the projecting end of the support member 162 and an x-ray tube 168 supported in the housing. The housing is of such size and shape that it is positionable within the tire supported by the manipulator assemblies 52, 54 so that the focal spot 19 of the tube 168 is adjacent or within the toroidal volume defined by the tire.

The housing comprises a first generally elbow shaped tubular housing member 174 having one end connected to the support member 162 and a second tubular generally elbow shaped housing member 176 which is connected to the projecting end of the housing member 74. A third housing member 178 FIG. 1 is connected across the projecting end of the housing member 176 to close off the interior of the housing and retain the x-ray tube in place.

The x-ray tube 168 is only schematically shown, but includes a body portion in which a cathode electrode is supported and a projecting envelope portion in which an anode or target electrode is situated. The target electrode is constructed and arranged to emit x-rays from the focal spot 19, which is relatively small, as a result of electrons from the cathode electrode impinging on the focal spot.

Figure 4:
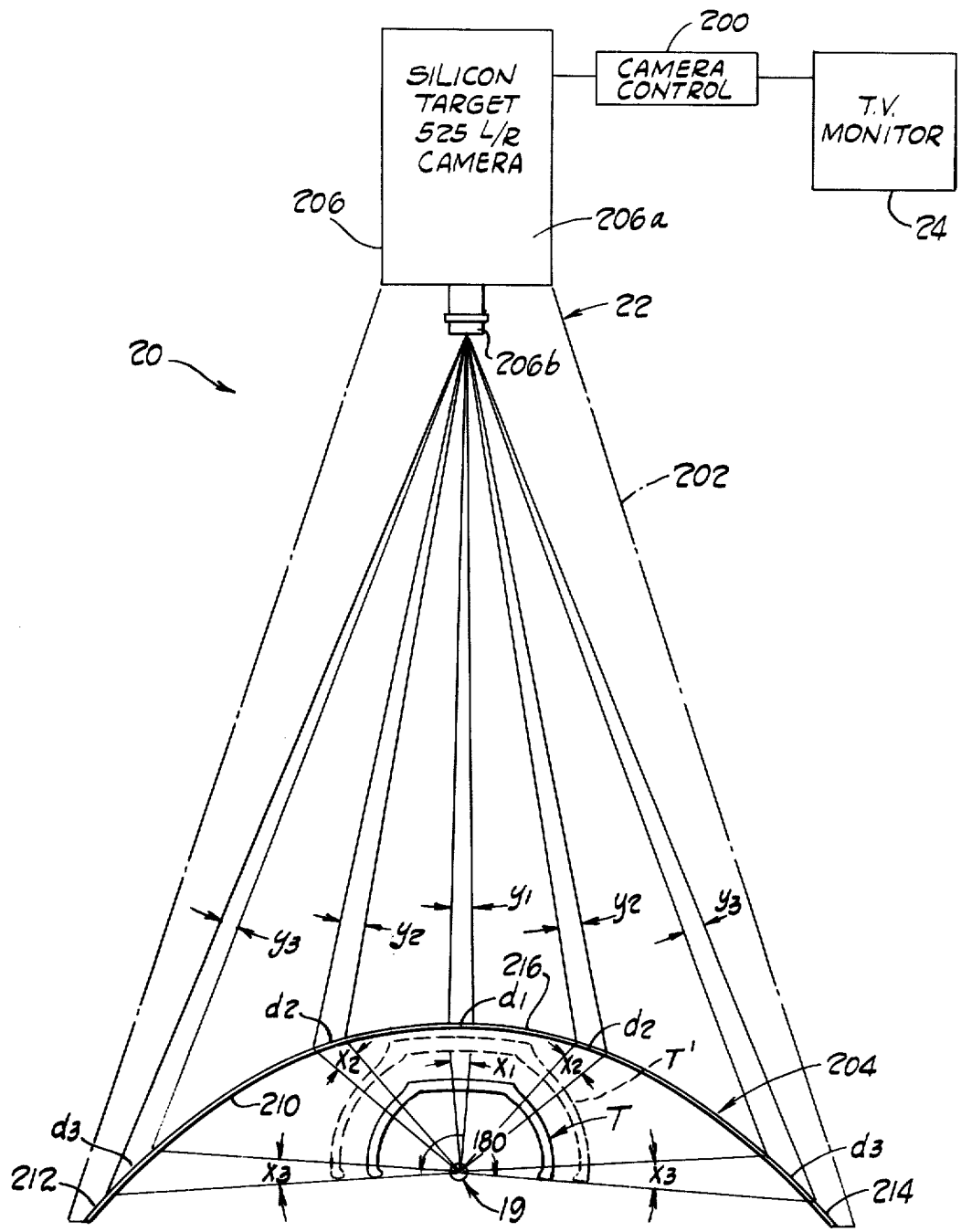

X-rays emitted by the target electrode pass through an x-ray transparent window, not illustrated, in the tube envelope portion and are directed from the focal spot through a wide angle about the tube. As shown in FIG. 4 the included angle 180 of the x-ray beam is sufficiently wide that it passes through all locations of the tire in the circumferential tire section adjacent the focal spot, including the tire bead rims.

The x-ray tube housing is preferably filled with a suitable dielectric fluid or other dielectric material and is hermetically sealed so that leakage into or from the housing does not occur.

The support member 162 is tubular and a high tension cable 182 extends through the member 162 from a suitable high voltage power supply, not shown, to the x-ray tube head assembly. The x-ray tube is preferably a water cooled tube and a suitable cooling manifold, not illustrated, is provided about the tube envelope portion through which cooling water flows. The cooling water flows to and from the x-ray tube head assembly through water lines 184 which extend through the support member 162 and the housing 174 along with the high voltage cable 182.

INFLATION AND MANIPULATION OF THE TIRE

The manipulator assembly 54 is constructed and arranged so that when a tire is supported between the manipulator assemblies 52, 54, pressurized air is introduced into the tire in the region between the hub portions 116, 116' via a pressurized air supply hose 188 connected to the assembly 54. Inflation and deflation of the tire is governed by suitable control valving, not shown, and the hubs 116, 116' are sealingly engaged with their supports and with the tire to prevent leakage of pressurized air from the tire.

Inflation of the tire results in the bead rims being spread axially apart and the tire wall cross section assumes a generally semicircular shape. The pressure of the inflation air acting over the area of the hubs 116 creates a substantial pressure force on the assemblies 52, 54 which causes the carriages 100, 100' to move away from each other against the biasing force provided by their actuators. Movement of the carriages 100, 100' away from each other enables axial separation of the tire bead rims and the movement of the carriages is limited by suitable rigid stops, not shown, so that the extent of the bead rim separation is controlled.

After a tire is inflated the x-ray tube head 160 and its shaft 162 are shifted relative to the hub portion 116 so that the tube head extends from the hub portion and the focal spot 19 is located medially between the axially spaced tire bead rims as is illustrated in FIG. 3. At this juncture the tire support members 112, 112' rotate the tire eccentrically relative to the extended x-ray tube head so that the tire, the hub portions 116, 116' and the rim members 113, 113' rotate and shift downwardly relative to the x-ray tube head. Since the x-ray tube head remains stationary during this movement the focal spot 19 of the x-ray tube moves relative to the tire to an inspection location within or adjacent the toroidal volume defined by the tire.

The eccentric movement of the tire with respect to the x-ray tube head is accomplished by a tire positioning drive system, only part of which is shown, which simultaneously eccentrically rotates the tire support members 112, 112' and rim members 113, 113' of each manipulator assembly 52 and 54. The drive system includes a drive motor, not shown, an output drive shaft 190 (FIG. 1) and chain drives 192 from the shaft 190 to the manipulator assemblies. Only one chain drive 192 is schematically shown in FIG. 1.

Referring again to FIG. 1, it should be appreciated that when the tire T is initially positioned at the inspection station, the tire is located above the position illustrated in the FIGURE and the tire bead rims are aligned with the rim members 113, 113'. The tire is supported in this aligned position by the ram 68 and the ramp member 60. The tire shifts to its inspection position against the bias of the ram 68 and thus the drive roller 74 is maintained in substantial frictional contact with the tire so that it can rotate the tire about its axial centerline.

THE RADIATION DETECTION SYSTEM

The wide angle x-ray beam produced by the tube head 160 passes through all portions of the circumferential tire section adjacent the focal spot and the radiation detection system functions to produce an x-ray image of the circumferential tire section. As the tire T is rotated about its centerline the x-ray beam passes through the complete tire as successive circumferential portions of the tire move through the beam. Thus the tire can be completely inspected during only a single revolution of the tire.

The radiation detection system 20 is schematically shown in FIG. 4 as comprising the imaging unit 22, the T.V. monitor 24 and camera controlling circuitry 200 between the imaging unit 22 and the T.V. monitor. The unit 22 comprises a light tight housing 202 (shown by broken lines in FIG. 4) which supports a fluorescent screen 204 and a T.V. camera and lens assembly 206.

The screen 204 is preferably a thin rectangular sheet of material which fluoresces, i.e. emits light, when impinged upon by x-rays from the focal spot 19 which have passed through the tire. The intensity of the light emitted from any location on the screen is proportional to the intensity of the x-rays impinging on that screen location. Accordingly, the screen 204 produces a visible image of the circumferential tire section between the focal spot and the screen.

The screen 204 is curved approximately parabolically transverse to its longitudinal extent so that its concave face 210 extends about the circumferential tire section and the focal spot 19. The opposite end portions 212, 214 of the screen extend obliquely away from the focal spot 19 and the tire bead rims while the midportion 216 of the screen extends approximately transverse to x-rays emanating from the focal spot 19. As shown in FIG. 2 the obliquely extending end portions of the screen are spaced from and do not interfere with components of the tire manipulator.

The T.V. camera 206a and lens 206b are supported by the housing 202 at its upper end and are positioned so that the entire area of the convex side of the screen is viewed by the lens and the camera. The camera and lens assembly is centered over the screen so that the midportion 216 of the screen is disposed on the optical axis of the lens 206b and the end portions 212, 214 extend away from the lens 206b proceeding toward the periphery of the field of view of the lens. The lens is spaced from the screen so that all locations on the screen are substantially in focus when directed by the lens to the camera input target. By way of example, an installation having a parabolic screen which is configured so that the apex of the screen is 11 inches vertically above the marginal edges of the screen end portions is provided with a T.V. camera having a 16mm target diameter and an $f0.95$ 25mm lens stopped down to $f4.0$. The apex of the screen is located 36 inches from the lens and the hyperfocal distance between the lens and the screen is 40 inches. The depth of field of the lens, at least when stopped down to $f4.0$, is substantial so that all portions of the screen are in focus.

The character of the curvature of the screen and the relationship between the screen, the focal spot of the radiation source and the camera lens are, according to the invention, such that the image produced on the T.V. monitor is that of a circumferential section or band of the tire which is substantially devoid of distortion particularly in the vicinity of the tire bead rims.

As shown in FIG. 4 the x-rays are directed uniformly about the focal spot through the angle 180 so that the beam passes through all locations of the surrounding circumferential tire section. The portion of the x-ray beam within the angle X passes through the tread area of a tire T being inspected and impinges on the screen to create an image extending across the midportion of the screen through an arc length $d_1$. The portions of the beam within the angles $X_2$ and $X_3$ pass through a side wall and bead rim, respectively, of the tire T and impinge on the screen to create images extending along the screen through arc lengths $d_2$ and $d_3$. The angles $X_1$, $X_2$ and $X_3$ are equal angles, but, as is apparent from FIG. 4, the arc length $d_3$ is greater than the arc length $d_2$ which is in turn greater than the arc length $d_1$.

Since the tire T is generally semicircularly curved about the focal spot the images along the arcs $d_1$, $d_2$, $d_3$ are of substantially equal sized segments of the tire and hence the image formed across the entire screen is distorted with the bead rim images being, in effect, enlarged relative to the image of the tread area. The placement of the camera 206a and lens 206b with respect to the screen 204 allows the lens and camera to view the arc lengths $d_1$, $d_2$ and $d_3$ simultaneously and the angles of view of the lens 206b to these respective arc lengths are shown in FIG. 4 as $Y_1$, $Y_2$ and $Y_3$, respectively. The angles $Y_1$, $Y_2$ and $Y_3$ are all equal since the arc lengths $d_3$ and $d_2$ are foreshortened, as seen by the lens 206b. Thus from the location of the lens 206b the arc lengths $d_1$, $d_2$ and $d_3$ appear equal and the distortion of the side wall and bead rim images of the screen is eliminated by the positional relationship between the screen and the lens 206b and camera 206a.

A larger tire T' is illustrated by broken lines in FIG. 4 and from the FIGURE it is apparent that the larger tire is related to the screen 204, focal spot 19 and camera and lens assembly 206 the same as the tire T.

The imaging unit 20 includes an actuator arrangement 220 for enabling the unit to be adjustably positionable with respect to the inspection station to enable loading and unloading of tires at the station without colliding with the housing 202 and to permit inspection of tires having various diameters. As best illustrated in FIGS. 1–3 the actuator arrangement includes a pair of depending guide rails 222 connected to the ceiling of the booth 12 over the inspection station. The housing 202 carries support elements 224 extending from its opposite sides which engage and interfit with track-like slots formed in the guide rails. A reversible electric motor 226 is fixed to the booth ceiling and the motor output shaft is associated with chain drive transmissions 228 extending along the respective guide rail to the housing 202.

In the illustrated embodiment, the chain drive is schematically illustrated as a chain fall having the end of each chain fixed to the housing and with each chain reaved around a drive sprocket on the motor shaft. When the motor is driven in one direction the chain pulls the housing upwardly along the guide rails and when the motor operates in the opposite direction the chain is played out and the housing is lowered by gravity. An electromagnetic brake, not shown, is associated with the motor for locking the drive shaft against rotation when the motor is deenergized.

The foregoing description of the imaging unit has been made in reference to a tire having a generally semicircular shape when positioned for inspection and the curvature of the screen 204 has been characterized as generally parabolic. There are tires which do not have generally semicircular cross sectional shapes when supported for inspection, viz. low profile tires which have wide generally cylindrical tread area. Such tires can be readily inspected according to the invention by compounding the curvature of the screen. For example, the screen midportion extending along the tread area of such a tire might be generally circularly curved to reduce distortion of the images proceeding toward the opposite lateral sides of the tire while the screen end portions extend, as described above, obliquely from the radiation source focal spot.

The screen 204 which is illustrated and described is preferably only a few inches wide and the tire image on the T.V. monitor preferably appears as a horizontal band on the monitor screen having the bead rims extending vertically at opposite horizontal sides of the image. Because the screen 204 is not curved about its longitudinal axis a slight amount of vertical distortion may appear on the monitor screen, i.e. the image will be gradually enlarged proceeding upwardly and downwardly from the vertical center of the image. So long as the screen 204 is relatively narrow and the diameter of the tires being inspected is appreciable, e.g. about 25 inches, this vertical distortion is not particularly pronounced. However, if use of a wider screen is desired, and/or relatively small diameter tires are to be inspected, the screen 204 can be circularly curved across its width (as well as parabolically curved along its length) to substantially reduce, if not eliminate the vertical image distortion. It should be noted that the generally parabolic curvature of the screen 204 eliminates horizontal distortion from the image on the T.V. screen even though vertical distortion may occur. That is to say along any given horizontal line on the T.V. screen, the image is substantially undistorted from one end of the line to the other.

In one preferred mode of operating the system 10, the x-ray tube is operated to produce pulses of x-rays at the power supply frequency, e.g. 60Hz. The speed of tire rotation is preferably controlled relative to the pulse frequency of the x-rays so that a stroboscopic effect is achieved. In particular when a belted tire is being inspected, the individual strands of the belts and of the plies are overlayed in the inspection image on the T.V. monitor. Depending on the speed of rotation of the tire a plurality of strand images can be overlayed or superimposed and form a common image on the T.V. monitor screen. Even though the various strand images are overlayed, defects in individual strands are readily detected.

While only a single embodiment of the invention is illustrated and described, the invention is not to be considered limited to the precise construction which is disclosed. By way of example, the new imaging unit can be employed in an inspection system utilizing an x-ray tube which produces a relatively narrow beam of x-rays which can be scanned about an x-ray beam axis. The beam passes through successive tire wall locations to the fluorescent screen. Although the time required to completely inspect a tire in such an apparatus is not substantially reduced as compared to some prior art proposals, such an apparatus is less complex and of smaller size than the prior art apparatuses employing orbitally movable imaging units.

Various adaptations, modifications and uses of the invention may occur to those skilled in the art to which the invention relates and the intention is to cover all such adaptations, modifications and uses which come within the scope or spirit of the appended claims.

What is claimed is:

1. In a tire inspection system for inspecting tires having side wall portions including bead rims and a tread area portion between the side wall portions:
    a. tire supporting means supporting a tire in a condition wherein said side wall portions extend radially inwardly toward the tire centerline from said tread area portion;
    b. radiation source means for directing tire penetrating radiation through a circumferential section of the tire including one bead rim, side wall portion and at least part of the tread area portion from a location between the tire centerline and the tread area portion, said location disposed in a first plane extending transversely to the tire centerline and between the tire side wall portions; and,
    c. an inspection information producing system by which inspection information concerning the construction of a tire is obtained comprising radiation responsive imaging means and camera means;
    d. said imaging means comprising:

i. an imaging member supported in the vicinity of the circumferential tire section through which radiation is directed from said source location, said member having a surface positioned with respect to said source location so that radiation passing through the circumferential tire section impinges on said member to produce a radiation stimulated image of part of the tire on said surface, said surface configured to describe a line curved generally parabolically about at least part of the circumferential section of the tire at the intersection of said surface and a second plane containing the tire centerline and extending through said source location, at least part of the tire tread area portion interposed between said source location and a first location on said imaging member surface, a tire bead rim interposed between said source location and a second location on said imaging member surface, said first and second locations disposed at different radial distances from the tire centerline and at different distances from said source location so that the image of part of the tire produced on said surface is distorted;

ii. optical coupling means between said camera means and said imaging member surface for transmitting the image on said surface to said camera means; and, iii. structure for positioning said optical coupling means with respect to said surface so that the image transmitted to said camera means is substantially undistorted.

2. In a tire inspection system for inspecting tires having side wall portions including bead rims and a tread area portion between the side wall portions:

a. tire supporting means supporting a tire in a condition wherein said side wall portions extend radially inwardly towards the tire centerline from said tread area portion;

b. radiation source means for directing tire penetrating radiation through a circumferential section of the tire including one bead rim, side wall portions and at least part of the tread area portion from a location between the tire centerline and the tread area portion, said radiation source means defining a focal spot at said location disposed adjacent or within a toroidal volume defined by the tire in a first plane extending transversely to the tire centerline and between the tire side wall portions with radiation from said focal spot emanating through a relatively wide angle and penetrating the adjacent circumferential section of the tire from bead rim to bead rim; and, c. an inspection information producing system by which inspection information concerning the construction of a tire is obtained comprising radiation responsive imaging means and camera means;

d. said imaging means comprising:

i. a fluorescent screen imaging member supported in the vicinity of the circumferential tire section through which radiation is directed from said source location, said member having a surface positioned with respect to said source location so that radiation passing through the circumferential tire section impinges on said member to produce a radiation stimulated image of part of the tire on said surface, said surface defining end portions disposed on opposite sides of said first plane with the tire bead rims interposed between said focal spot and said respective end portions, said end portions extending obliquely away from said first plane and said surface configured to describe a line curved generally parabolically about said circumferential tire section and said focal spot at the intersection of said surface and a second plane containing the tire centerline and extending through said source location, at least part of the tire tread area portion interposed between said source location and a first location on said imaging member surface, a tire bead rim interposed between said source location and a second location on said imaging member surface, said first and second locations disposed at different radial distances from the tire centerline and at different distances from said source location so that the image of part of the tire produced on said surface is distorted;

ii. optical coupling means between said camera means and said imaging member surface for transmitting the image on said surface to said camera means; and, iii. structure for positioning said optical coupling means with respect to said surface so that the image transmitted to said camera means is substantially undistorted.

3. The system claimed in claim 2 wherein said optical coupling means comprises a lens spaced from and centered with respect to said screen, said lens having a substantial depth of field for focusing said screen to said camera means regardless of the difference in distances between said lens and various locations on said screen.

* * * * *